US007929606B2

(12) United States Patent
Jeon et al.

(10) Patent No.: US 7,929,606 B2
(45) Date of Patent: Apr. 19, 2011

(54) METHOD AND APPARATUS FOR ENCODING/DECODING VIDEO SIGNAL USING BLOCK PREDICTION INFORMATION

(75) Inventors: Byeong Moon Jeon, Seoul (KR); Seung Wook Park, Seoul (KR); Ji Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 459 days.

(21) Appl. No.: 11/918,212

(22) PCT Filed: Jan. 20, 2006

(86) PCT No.: PCT/KR2006/000233
§ 371 (c)(1),
(2), (4) Date: Jun. 16, 2008

(87) PCT Pub. No.: WO2006/078141
PCT Pub. Date: Jul. 27, 2006

(65) Prior Publication Data
US 2009/0052528 A1    Feb. 26, 2009

Related U.S. Application Data

(60) Provisional application No. 60/645,035, filed on Jan. 21, 2005, provisional application No. 60/648,421, filed on Feb. 1, 2005, provisional application No. 60/649,621, filed on Feb. 4, 2005.

(30) Foreign Application Priority Data

Mar. 25, 2005    (KR) .................. 10-2005-0024987

(51) Int. Cl.
*H04B 1/66* (2006.01)
(52) U.S. Cl. ......... 375/240.12; 375/240.25; 375/240.26; 375/240.29; 375/240.13; 375/240.16; 382/233; 382/235; 382/238; 382/236

(58) Field of Classification Search ............. 375/240.12, 375/240.25, 240.26, 240.29, 240.13, 240.16; 382/233, 235, 238, 236
See application file for complete search history.

(56) References Cited

U.S. PATENT DOCUMENTS
5,818,531 A  * 10/1998 Yamaguchi et al. ....... 375/240.2
(Continued)

FOREIGN PATENT DOCUMENTS
KR    10-2004-0054747    6/2004
(Continued)

OTHER PUBLICATIONS

Search report dated Sep. 25, 2009 by European Patent Office for counterpart European Application No. 06715733.

(Continued)

*Primary Examiner* — Shawn An
(74) *Attorney, Agent, or Firm* — Harness, Dickey & Pierce, P.L.C.

(57) ABSTRACT

This invention relates to a method and apparatus for encoding video signals using prediction information of an intra mode block of a sub-layer and decoding the encoded video data accordingly. The method encodes a video signal in a scalable MCTF scheme to output a bit stream of an enhanced layer, and simultaneously encodes the video signal using a predetermined method to output a bit stream of a base layer. When the video signal is encoded in the MCTF schemes, an image block included in an arbitrary frame of the video signal is coded as an intra mode using pixels adjacent to the image block, on the basis of prediction information of the corresponding block coded as the intra mode, the corresponding block being included in a bit stream of the base layer and corresponding to the image block.

12 Claims, 6 Drawing Sheets

U.S. PATENT DOCUMENTS

| | | | |
|---|---|---|---|
| 6,002,803 | A | 12/1999 | Qian et al. |
| 6,043,846 | A | 3/2000 | Shen et al. |
| 6,510,177 | B1 * | 1/2003 | De Bonet et al. ........ 375/240.16 |
| 2002/0110194 | A1 | 8/2002 | Bottreau |
| 2002/0159518 | A1 | 10/2002 | Bottreau et al. |
| 2004/0101052 | A1 | 5/2004 | Roh |

FOREIGN PATENT DOCUMENTS

| | | |
|---|---|---|
| KR | 10-2004-0091686 | 10/2004 |
| KR | 10-2006-0006711 | 1/2006 |
| WO | WO 2006/075240 | 7/2006 |

OTHER PUBLICATIONS

Bao, Y. et al "A Low-Complexity AVC-based Scalable Video Codec" ISO/IEC JTC1/SC29/WG11—Hong Kong Jan. 2005.

Bao, Y. et al "Low-Complexity AVC-based Scalable Video Codec" ITU-T SG16 Q.6 VCEG-Y 13, Geneva, Nov. 2004.

Reichel, J. et al—"Scalable Video Model 3.0" ISO/IEC JTC 1/SC 29/WG 11 N6716, Palma de Mallorca, Oct. 2004.

Wiegand, T. Draft ITU-T Recommendation and Final Draft International Standard of Joint Video Specification (ITU-T Rec. J.264 / ISO-IEC 14496-10 AVC) Geneva, May 2003.

Moon, B-M, et al. "Inter-layer prediction of the temporally enhanced pictures", ISO/IEC JTC1/SC29/WG11, Hong Kong, Jan. 2005.

Schwartz, H. et al. "SVC Core Experiment 2.1: Inter-layer prediction of motion and residual data" ISO/IEC JTC 1/SC 29/WG 11/M11043, Jul. 2004.

Francois, E. "Extended Spatial Scalability" ISO/IEC JTC1/SC29/WG11, Hong Kong, Jan. 2005.

International Search Report dated Apr. 24, 2006 for counterpart Application No. PCT/KR2006-000234.

Office Action dated Sep. 18, 2008 for counterpart Korean Application 10-2005-0049908 (without translation).

Search Report by European Patent Office dated Sep. 25, 2009 for counterpart European Application No. 06714734.7.

Schwartz, et al "SNR-Scalable Extension of H.264/AVC" Frauenhofer Institute for Telecommunications, 2004 Int'l Conference, Berlin, Germany.

Andreopoulos et al. "Fully-scalable wavelet video coding using in-band motion compensated temporal filtering" In: Acoustics, Speech, and Signal Processing, 2003 Proceedings.(ICASSP'03)2003 IEEE International Conference, Apr. 6-10, 2003, vol. 3, p. III-417-20.

Schwartz, H. et al. "MCTF and Scalability Extension of H.264/AVC", Frauenhofer Institute for Telecommunications—Berlin.

Rhee, V. et al "Block-Level Refinement of Motion Description in Layered H.261 Video".

European Search Report dated Sep. 7, 2010 for Application No. 06 715 733.9.

Screenshot http://ftn3.itu.org/av-arch/video-site/0501_Hon/.

* cited by examiner intra 4x4

4 MBs divided into 4x4 cells intra 8x8

4 MBs divided into 8x8 cells intra 16x16 not-divided 4 MBs

*intra 4x4* → *4 MBs divided into 8x8 cells*

*intra 8x8* → *not-divided 4 MBs*

*intra 16x16* → *not-divided 4 MBs*

METHOD AND APPARATUS FOR ENCODING/DECODING VIDEO SIGNAL USING BLOCK PREDICTION INFORMATION

PRIORITY INFORMATION

This application is a U.S. National Stage Application of International Application PCT/KR2006/000233 filed Jan. 20, 2006 and claims the benefit of priority to U.S. Provisional Application Nos. 60/645,035, 60/648,421 and 60/649,621 filed Jan. 21, 2005, Feb. 1, 2005 and Feb. 4, 2005, respectively; the entire contents of which are hereby incorporated by reference. Also, this application claims the benefit of priority to Korean Application No. 10-2005-0024987 filed in the Korean Patent Office on Mar. 25, 2005; the entire contents of which are hereby incorporated by reference.

TECHNICAL FIELD

The present invention relates to a scalable encoding and decoding of a video signal. More particularly, the present invention relates to a method and apparatus for encoding a video signal using prediction information of intra mode blocks of a base layer and decoding the encoded video data accordingly when performing a scalable coding in a motion compensated temporal filter (MCTF) scheme.

BACKGROUND ART

It is not easy to allocate bands as wide as a bandwidth for TV signals with respect to digital video signals which are transmitted and received by a mobile phone and a notebook, which are prevalently in use, a mobile television and a handheld PC which will be used prevalently in future. Hence, standard of video compression for mobile devices should provide higher video signal compression efficiency.

Moreover, such mobile devices inevitably have varying inherent capabilities of processing or presenting video signals. Therefore, a compressed image must be variously prepared in advance to correspond to such capabilities, which means that video data having various image qualities, with respect to various combined parameters, such as the number of frames per second, the resolution, and the number of bits per pixel, must be provided for a single image source, thus inevitably placing a great burden on content providers.

On this account, the content providers prepare compressed video data having a high bit rate for each individual image source, and, when the mobile device requests the video data, perform a procedure of decoding a compressed image and encoding the decoded image into video data suitable for the video processing capability of the mobile device that requested the image, and then provides the encoded video data. In doing so, since the transcoding, which implies the decoding and the encoding, is requisite, a time delay occurs until providing the video data requested by the mobile device. Also, the transcoding requires complicated hardware devices and algorithms depending on the variety of encoding targets.

A scalable video codec (SVC) is suggested as a solution for the above disadvantages. The SVC encodes a video signal at maximum quality and allows the video presentation of low quality even when a partial sequence, which is a sequence of a frame selected intermittently from the entire sequence, of the generated picture sequence produced from the encoding. A motion compensated temporal filter (MCTF) scheme is the encoding scheme suggested for the SVC.

As discussed above, while the picture sequence encoded in the scalable MCTF can present the video of low quality merely by receiving and processing the partial sequence, the image quality degrades considerably when the bit rate lowers. To overcome this disadvantage, an auxiliary picture sequence for low transmission rate, for example, a picture sequence having small screen and/or low frames per second may be provided separately. The auxiliary sequence is referred to as a base layer, and the main picture sequence is referred to as an enhanced or enhancement layer. But, since the base layer and the enhanced layer encode the same video signal source, redundant information (redundancy) is present in the video signal in both layers.

To improve the coding efficiency of the enhanced layer encoded according to the MCTF scheme, a prediction image of the enhanced layer is generated from an arbitrary video frame of the base layer temporally coincident with the video frame of the enhanced layer, as shown in FIG. 1.

Referring to FIG. 1, a certain number of macro blocks of the base layer are reconstructed as one picture, and the picture is enlarged to the size equal to the video frame of the enhanced layer by up-sampling the picture (S10). When the macro block BM10, in the enlarged picture B100, at the same position as the macro block EM10 in the frame E100, which is temporally coincident with the enlarged picture B100 of the base layer, of the enhanced layer of which the current prediction image is to be generated, is coded as an intra mode, a prediction procedure for the macro block EM10 of the enhanced layer is carried out based on the macro block BM10 (S11).

In more detail, after the original block image of the macro block BM10, coded in a intra mode, of the base layer is recovered using pixel values of lines adjacent to the macro block BM10, a difference or error value of the recovered block image, that is, residual is encoded to the macro block EM10 of the enhanced layer.

The scheme using the original image of the intra mode block of the base layer needs to recover first the original image of the intra mode block of the base layer which is to be used for encoding and decoding image blocks in the arbitrary frame of the enhanced layer, according to the prediction information. The problem is that this recovery requires pretty high hardware complexity.

DISCLOSURE OF INVENTION

An object of the present invention is to provide a method and apparatus for coding a video signal to a prediction image in the scalable scheme using the prediction information of the block of the base layer without recovering the image of the intra mode blocks of the base layer.

Another object of the present invention is to provide a method and apparatus for decoding data stream having the encoded block by use of the prediction information of the intra mode blocks of the base layer.

To achieve the above objects of the present invention, the video signal is encoded in a scalable MCTF scheme and output as a bit stream of a first layer, and simultaneously, the video signal is encoded in a preset scheme and output as a bit stream of a second layer. An image block in an arbitrary frame of the video signal is encoded in the MCTF scheme using adjacent pixels of the image block in an intra BL mode based on prediction information of a first block, contained in a bit stream of the second layer, coded in an intra mode.

According to an aspect of the present invention, the prediction information divided into information relating to a prediction mode and information relating to a prediction direction (DoP).

According to an aspect of the present invention, the frames of the second layer are encoded to smaller screen frames than the frames of the first layer.

According to an aspect of the present invention, the image block is split into a plurality of cells based on the prediction mode of the first block and a difference value of each pixel of the cells is acquired and coded by equally applying a prediction direction of a partial area in the first block, corresponding to a group comprising a certain number of the split cells, to the cells in the group.

According to another aspect of the present invention, the image block is split into a plurality of cells in a size which is acquired by multiplying a size set in the prediction mode of the first block by a screen size ratio of the first layer to the second layer, and a difference value of each pixel of a cell is acquired and coded by applying, to the cell, a prediction direction of a partial area of the first block corresponding to the cell.

According to still another aspect of the present invention, a difference value between error data acquired based on the prediction information of the first block and error data of the first block or the partial area of the first block, is coded to the image block.

BRIEF DESCRIPTION OF DRAWINGS

The above and other objects, features and advantages of the present invention will become apparent from the following description of preferred embodiments given in conjunction with the accompanying drawings, in which.

MODES FOR CARRYING OUT THE INVENTION

Hereinafter, the embodiments of the present invention will be described in detail with reference to accompanying drawings.

Figure 1:
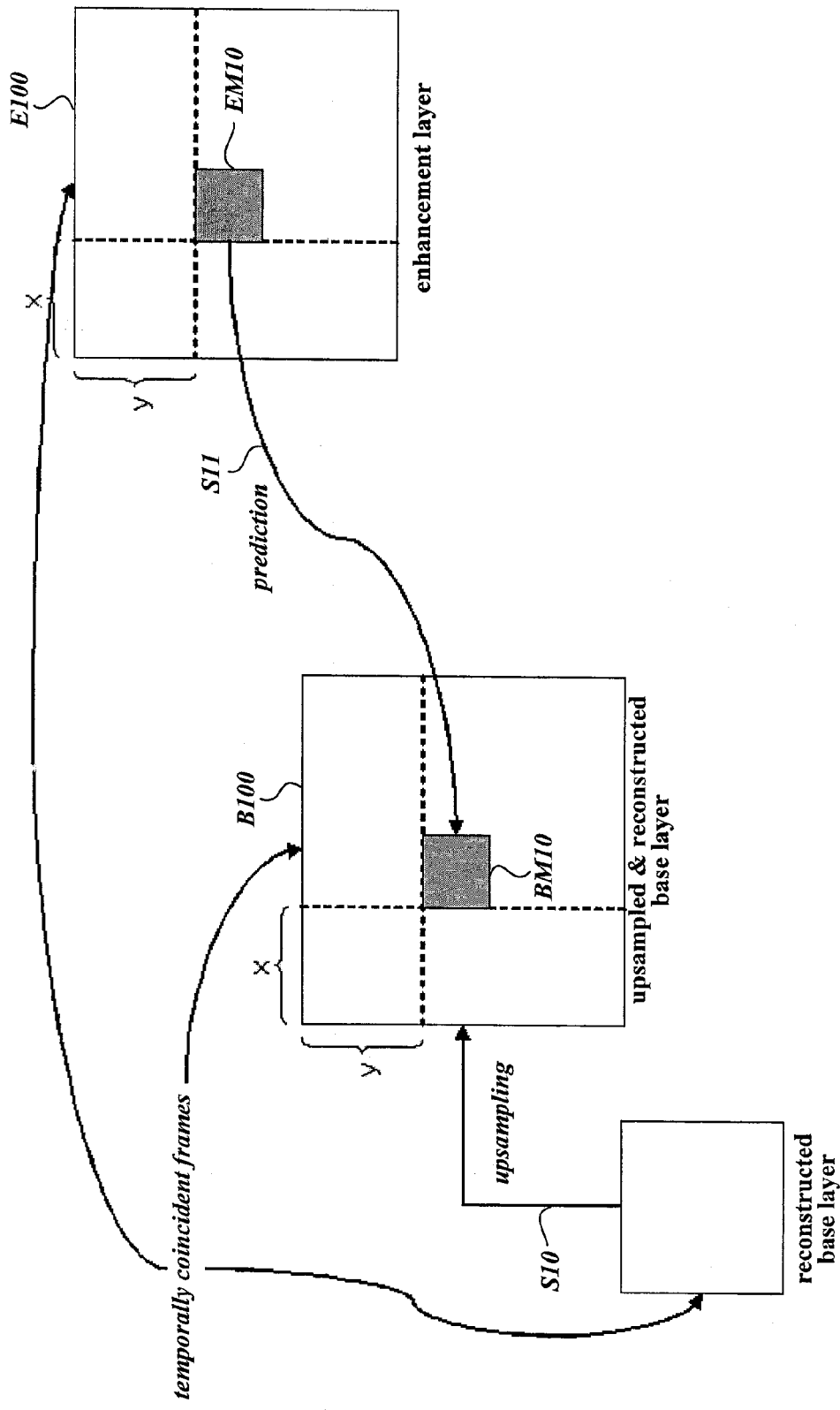
FIG. 1 illustrates a conventional scheme for reconstructing a prediction image of an enhanced layer from a block at the same position in an enlarged frame of a base layer temporally coincident.
Figure 2:
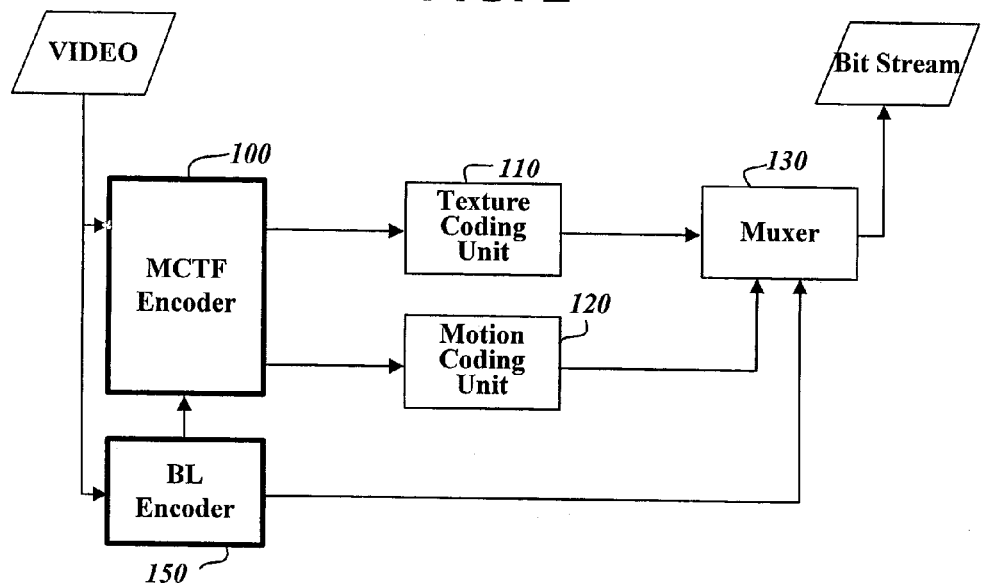
FIG. 2 is a block diagram of a video signal encoding apparatus to which a video signal coding method is applied.

FIG. 2 is a block diagram of a video signal encoding apparatus to which a video signal scalable coding method in accordance with the present invention is applied.

In FIG. 2, the video signal encoding apparatus, to which the present invention is applied, includes a MCTF encoder 100, a texture coding unit 110, a motion coding unit 120, a base layer (BL) encoder 150, and a muxer 130. The MCTF encoder 100 encodes an incoming video signal by unit of macro blocks according to the MCTF scheme, and generates proper management information. The texture coding unit 110 converts the information of the encoded macro blocks to a compressed bit stream. The motion coding unit 120 codes motion vectors of the image blocks acquired at the MCTF encoder 100, to a compressed bit stream according to a predefined scheme. The BL encoder 150 generates a sequence of small screens, for example, a sequence of pictures which is 25% of the original size by encoding the incoming video signal according to a predefined scheme, for instance, according to MPEG 1, 2, or 4, or H.261, H.263 or H.264. The muxer 130 encapsulates the output data of the texture coding unit 110, the small screen sequence of the BL encoder 150, and the output vector data of the motion coding unit 120 in a preset format, multiplexes them in a preset transmission format, and outputs the multiplexed data.

The MCTF encoder 100 performs motion estimation and prediction with respect to the macro blocks in an arbitrary video frame, and updating which adds image difference with macro blocks in an adjacent frame, to a corresponding macro block.

Figure 3:
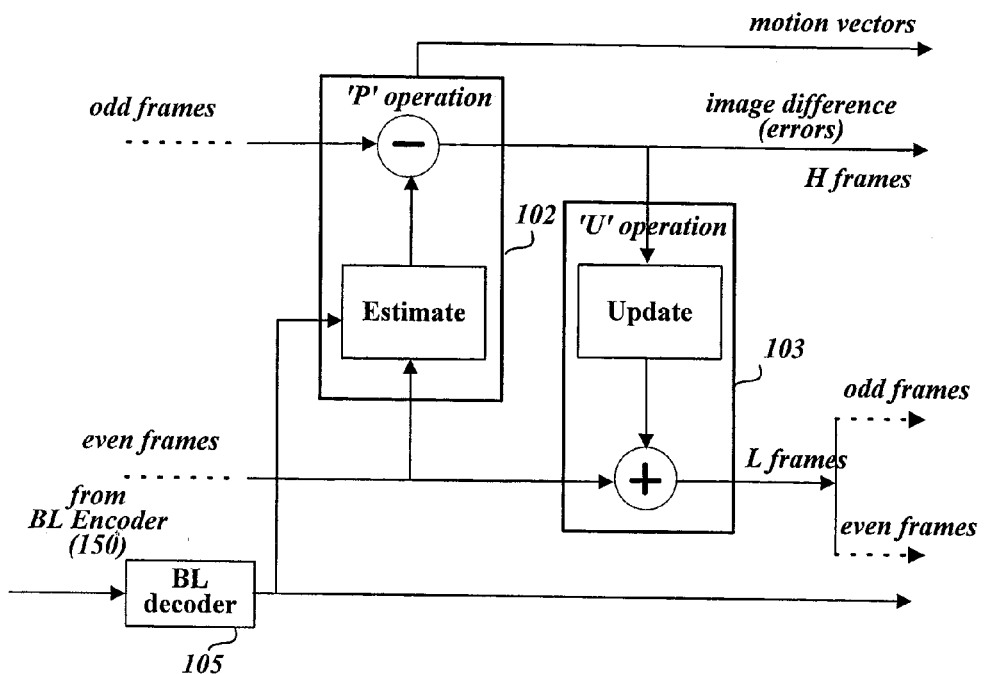
FIG. 3 illustrates video estimation/prediction and updating in the MCTF encoder of FIG. 2.

The MCTF encoder 100 divides the incoming video frame sequence to, for example, odd and even frames, and performs the motion estimation/prediction and the updating over several times, for example, until one group of pictures (GOP) has only one L frame, which is the resultant frame by the updating. FIG. 3 shows the estimation/prediction and the updating of one step, which is referred to as a MCTF level, of the several steps.

In FIG. 3, a BL decoder 105, an estimation/prediction unit 102, and an update unit 103 are included. The BL decoder 105 extracts encoding information, such as frame rate and macro block mode, from the base layer stream of the small screen sequence encoded at the BL encoder 150. With respect to each macro block in the frame to be coded to have residual data, the estimation/prediction unit 102 detects reference blocks in the previous or next adjacent frame through the motion estimation, codes image difference between the reference blocks and a corresponding block, and directly calculates motion vectors with respect to the reference blocks, or the estimation/prediction unit 102 codes the macro block using information of macro blocks extracted by the BL decoder 105. The update unit 103 performs an update operation, with respect to each macro block which is detected as the reference block in the motion estimation, of normalizing the image difference obtained in the motion estimation, and then adding the image difference to the corresponding macro block. The operation conducted at the update unit 103 is referred to as a U operation, and a frame generated through the U operation is referred to as an L frame.

The estimation/prediction unit 102 and the update unit 103 of FIG. 3 can process a plurality of slices which are splits of one frame, rather than the video frames, at the same time in parallel. A frame or slice having the image difference generated by the estimation/prediction unit 102 is referred to as an H frame or slice. Data of the difference value in the H frame or slice reflects a high frequency component of the video signal. Hereafter, it is considered that the term 'frame' implies the slice when the technical equivalence is maintained.

The estimation/prediction unit 102 splits the incoming video frames or the L frames acquired at the previous phase into macro blocks in a preset size, detects a block having the highest correlation with the image of the split macro blocks from previous and/or next frames temporally adjacent, generates a prediction image based on the detected frames and calculates the motion vectors. If the block having the correlation greater than a proper threshold is not detected, and there is no information relating to the temporally coincident frame in the encoding information provided from the BL decoder 105 or the corresponding block in the temporally coincident frame, that is, the block at the relatively same position in the frame, is not the intra mode, the current macro block is coded in the intra mode using adjacent pixel values. This operation is referred to as a P operation, and an H frame is generated through the P operation. This operation is well known to one skilled in the art, and thus detailed descriptions thereof, which are out of the scope of the invention, will be omitted for clarity. According to embodiments of the present invention, how to encode the macro blocks that have not motion-estimated into the prediction image having residual data, using the prediction information of the intra-mode blocks of the base layer temporally coincident is explained in detail in reference to FIGS. 4A through 4C and FIGS. 5A through 5C.

Figure 4A:
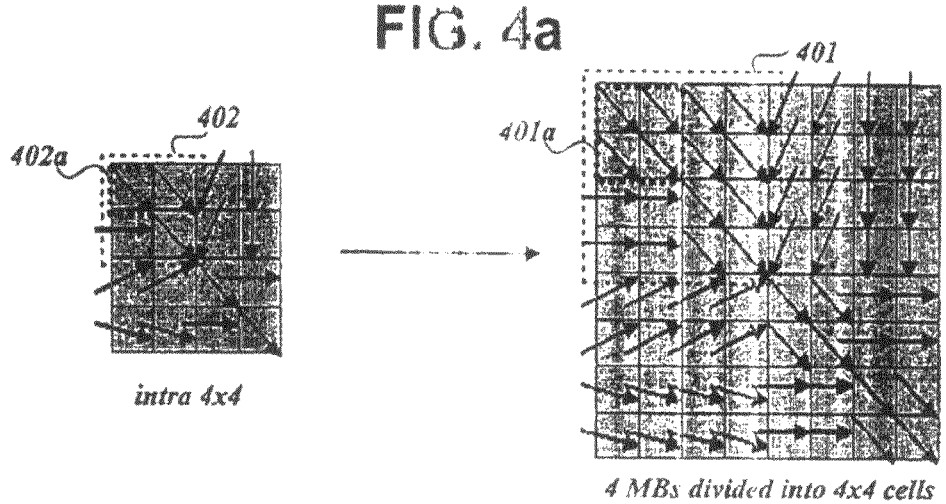
FIGS. 4A, 4B, and 4C illustrate how to code the macro blocks of the enhanced layer as intra mode using prediction information of an intra mode block of the base layer according to one embodiment of the present invention.
Figure 4B:
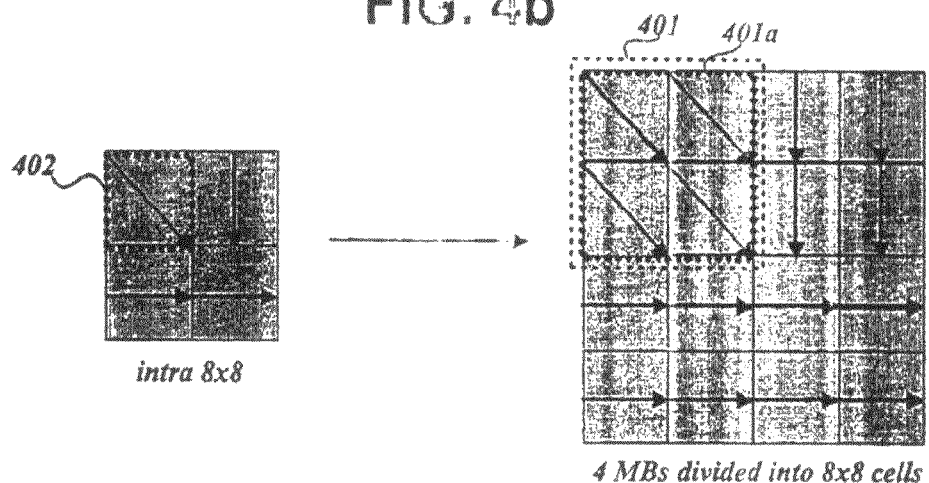
Figure 4C:
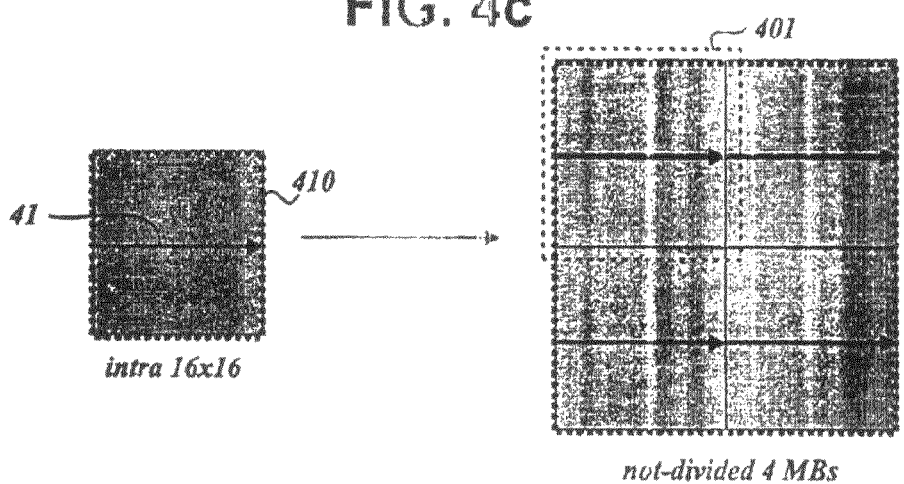

First, one embodiment of the present invention is now explained in reference to FIGS. 4A through 4C.

If it is confirmed from the encoding information provided from the BL decoder 105 that the corresponding block in the frame temporally coincident is the intra mode, the estimation/prediction unit 102 checks a prediction mode and a prediction direction (DoP) of the corresponding block. Herein, the corresponding block indicates a block at the relatively same position in the frame as the current macro block of the enhanced layer when the enhanced layer equals to the base layer in the screen size. When the enhanced layer is greater than the base layer in the screen size, the corresponding block indicates a block having the image area which covers the current macro block of the enhanced layer after the frame of the base layer is scaled up to the frame size of the enhanced layer.

In one embodiment of the present invention, the screen size of the frame encoded by the MCTF encoder 100 is four times as large as the screen size of the frame encoded by the BL encoder 150. Accordingly, the two screen sizes are different from each other.

In one embodiment of the present invention, the BL encoder 150 uses intra mode types, that is, predictions modes of intra 4×4, intra 8×8, and intra 16×16 with respect to the intra mode, as shown in FIGS. 4A through 4C, respectively. The BL encoder 150 uses nine DoPs (e.g., directions of arrow in the drawings) for intra 4×4 and intra 8×8, and uses four DoPs for intra 16×16.

The estimation/prediction unit 102 confirms the prediction mode and then splits the current macro block 401 into cells according to the prediction mode of the base layer. In specific, when the prediction mode of the base layer is the intra 4×4 as shown in FIG. 4A, the current macro block 401 is split into cells having 4×4 size. As for the intra 8×8 mode as shown in FIG. 4B, the current macro block 401 is split into cells having 8×8 size. As for the intra 16×16 mode as shown in FIG. 4C, the current macro block 401 is split into cells having 16×16 size. As such, the estimation/prediction unit 102 performs the coding using the necessary adjacent pixels based on 102 performs the coding using the DoP information of the corresponding macro block of the base layer for the respective cells.

In one embodiment of the present invention, the macro block 401 of the enhanced layer has pixels corresponding to the image which is a quarter of the corresponding macro block of the base layer. Since the current macro block 401 is split into the cells that equal to the prediction mode of the corresponding macro block of the base layer, more DoP information, that is, four times as much as used in the corresponding block is required. The quarter partial block 402 of the macro block of the base layer, corresponding to the current macro block 401, includes four DoP information as for the intra 4×4 type as shown in FIG. 4A, and includes one DoP information as for the intra 8×8 type as shown in FIG. 4B. For each case, the number of cells split in the current macro block is 16 and 4 respectively. Accordingly, the number of split cells is greater than the number of usable DoP by the screen size ratio between the layers, for example, by four times.

Thus, the estimation/prediction unit 102 groups the split cells of the current macro block 401 in units of four cells and then performs the intra mode coding by uniformly using the DoP of the area corresponding to each cell group in the quarter partial block 402. For instance, in FIG. 4A, four cells of a top left cell group 401a each are coded to the intra mode by equally using the DoP information of a top left cell 402a of the quarter partial block 402 in the corresponding block. In FIG. 4B, four cells in a cell group 401a, which equals to the macro block 401 in size, each are coded to the intra mode by equally using the DoP information of the quarter partial block 402 of the base layer corresponding to the cell group 401a. The same principle applies to the other cell groups of the macro block or the other macro blocks.

The intra mode coding, according to the set DoP, properly selects the pixel values of the adjacent left and/or upper pixel line and codes a difference value (residual) of the pixels based on the average, or codes a difference value (residual) with a value which is acquired by properly interpolating pixel values of the two adjacent lines according to the DoP.

Meanwhile, as shown in FIG. 4C, when the corresponding block of the base layer is coded to the intra 16×16, that is, when one 16×16 macro block is coded according to one DoP 41, the estimation/prediction unit 102 intra-codes not only the current macro block 401 but also three macro blocks that are adjacent to the macro block 401 with the same corresponding block 41, by uniformly using the DoP 41 of the corresponding block 410.

In another embodiment of the present invention, the estimation/prediction unit 102 splits the current macro block 401 into cells based on the prediction mode relating to the corresponding block of the current macro block 401 and the screen size ratio of the frame which is coded in comparison with the frame of the base layer.

Figure 5A:
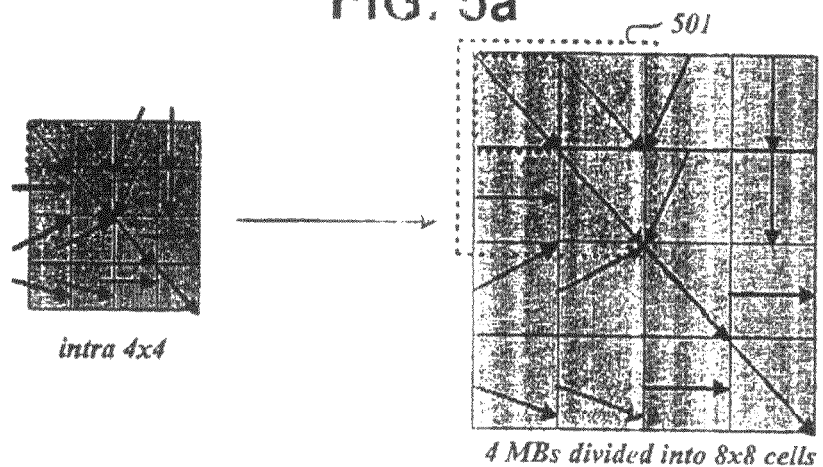
FIGS. 5A, 5B, and 5C illustrate how to code the macro block of the enhanced layer as intra mode using prediction information of an intra mode block of the base layer according to another embodiment of the present invention.
Figure 5B:
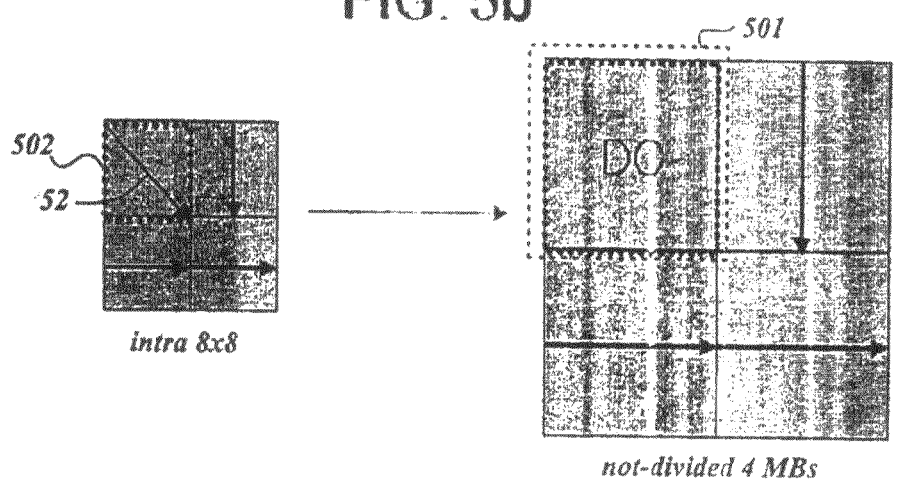
Figure 5C:
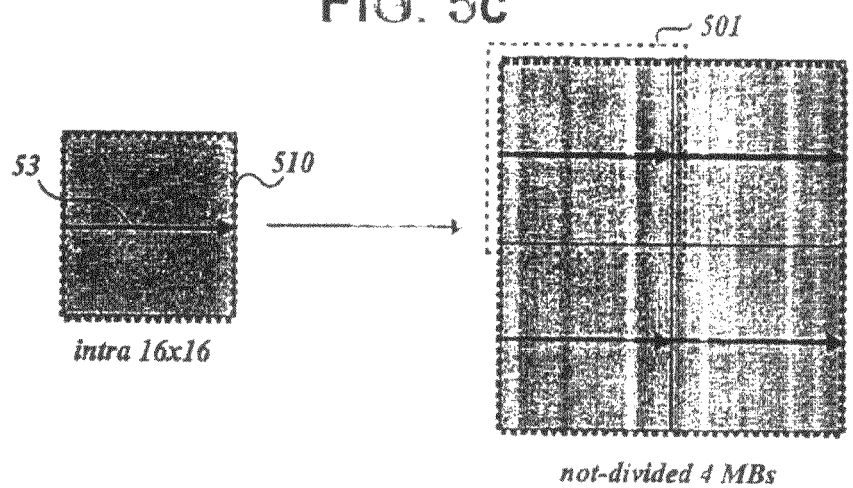

Under conditions that the screen size of the enhanced layer frame is four times as large as the base layer frame, if the intra mode block of the base layer is the intra 4×4 mode as shown in FIG. 5A, a current macro block 501 is split to cells having 8×8 size corresponding to four times of the intra 4×4 mode. As for the intra 8×8 mode as shown in FIG. 5B, the current macro block 501 is not split because the size by the four times as large as the intra 8×8 is equal to the size of the current macro block 501. This also applies to the intra mode 16×16 of the corresponding block of the current macro block 501 as shown in FIG. 5C.

In another embodiment of the present invention, when the macro block is split, the split cells correspond to the DoP information in the 4×4 partial area of the corresponding block one by one, as shown in FIG. 5A. Hence, the estimation/prediction unit 102 performs the intra-coding using the DoP information of the 4×4 area spatially corresponding to the split cells of the macro block 501.

However, while using the mode having the size greater than the intra-coded mode in the arbitrary macro block of the base layer, for example, in case of using the intra 8×8 of the base layer, when the higher intra 16×16 is used in the enhanced layer, the same DoP may not be used. For instance, as shown in FIG. 5B, when the corresponding block of the base layer is coded to the intra 8×8 and the quarter partial block 502 in the corresponding block corresponding to the current macro block 501 has the diagonal DoP 52, the current macro block 501 should use the diagonal DoP in the intra 16×16 mode. But, the intra 16×16 mode is unavailable because the diagonal DoP is not defined in the four DoP of the intra 16×16 mode.

As such, when it is impossible to use the DoP information of the corresponding block, the estimation/prediction unit 102 takes advantage of a DC coding or a plane coding based on the pixel values of the two adjacent lines and/or the fixed value, for instance, based on the average of the summation with 128, regardless of the direction with respect to the current macro block 501 as shown in FIG. 5B.

In case that the corresponding block is coded to the intra 16×16 as shown in FIG. 5C, it is impossible to split the current macro block 501 and adjacent three blocks, together with the current macro block 501, have the same corresponding block 510. Accordingly, the intra-coding is executed using one DoP 53 of the corresponding block 510 in common with respect to the four macro blocks. This is the same as in FIG. 4C.

After the intra mode coding, the estimation/prediction unit 102 records mode information informing that the coding is carried out using the DoP of the corresponding block of the base layer, in header information of the macro block, for example, in the block mode. The mode information is discriminated from the information indicating the intra mode which is coded using the adjacent pixels of the enhanced layer without using the prediction information of the intra mode block of the base layer.

According to another embodiment of the present invention, after temporarily storing the residual block which is intra-coded with respect to the current macro block according to the schemes as shown in FIGS. 4A through 4C or FIGS. 5A through 5C, a pixel difference value between the temporary block and the corresponding block of the base layer or the partial area of the corresponding block may be coded to the macro block. That is, the difference between the intra mode coded error data is coded. For doing so, the BL decoder 105 provides the encoded video frames as well as extracts the encoding information from the base layer stream. When the enhanced layer differs from the base layer in screen size, the encoded video frame of the base layer is enlarged according to the ratio through the up-sampling and provided to the estimation/prediction unit 102.

As described above, all or part of the encoded data stream, according to the channel capacity, is transmitted to a decoding apparatus by cable or by radio, or by way of a recording medium. The decoding apparatus restores the original video signal of the enhanced layer and/or the base layer as follows.

Figure 6:
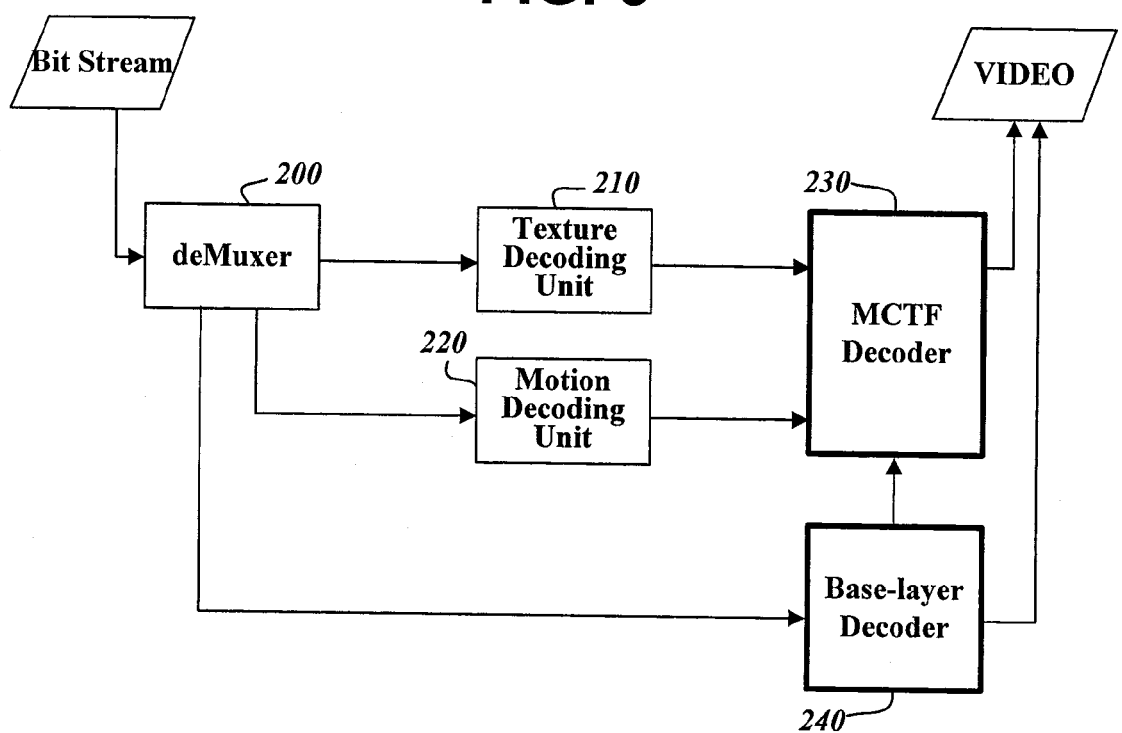
FIG. 6 is a block diagram of an apparatus which decodes the data stream encoded by the encoding apparatus of FIG. 2.

FIG. 6 is a block diagram of an apparatus which decodes the data stream encoded by the encoding apparatus of FIG. 2. The decoding apparatus of FIG. 6 includes a demuxer 200 which separates a compressed motion vector stream and a compressed macro block information stream from the received data stream, a texture decoding unit 210 which restores the compressed macro block information stream to its original non-compressed state, a motion decoding unit 220 which restores the compressed motion vector stream to its original non-compressed state, a MCTF decoder 230 which inversely converts the decompressed macro block information stream and the decompressed motion vector stream to the original video signal according to the MCTF scheme, and a BL decoder 240 which decodes the base layer stream according to a predetermine scheme, for example, according to MPEG4 or H. 264. The BL decoder 240 decodes the incoming base layer stream, and simultaneously provides header information in the stream to the MCTF decoder 230, to thus allow utilization of the required encoding information of the base layer, for example, the prediction information of the intra mode block.

Figure 7:
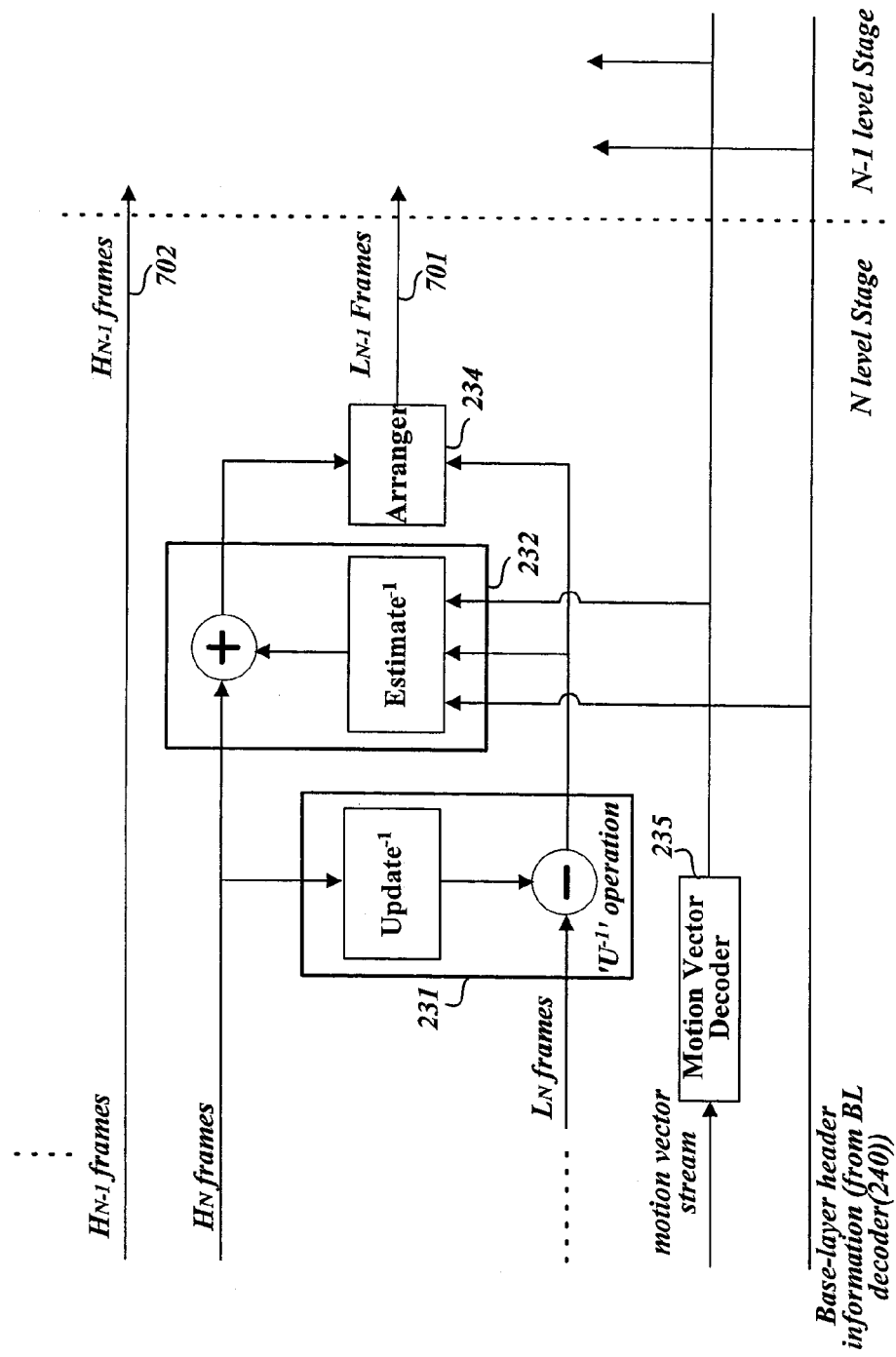
FIG. 7 illustrates inverse prediction and inverse updating at the MCTF decoder of FIG. 6.

To restore the original frame sequence from the incoming stream, the MCTF decoder 230 includes components as shown in FIG. 7.

The MCTF decoder 230 of FIG. 7 is configured to restore H and L frame sequences of the MCTF level N to the L frame sequence of the level N−1. In FIG. 7, an inverse update unit 231 subtracts a difference value of pixels of the incoming H frames from the L frames, an inverse estimation unit 232 restores the L frames having the original image using the L frames, which the image difference of the H frames is subtracted from, and the H frames, a motion vector decoder 235 decodes the incoming motion vector stream and provides the motion vector information of the macro blocks of the H frames to the inverse estimation unit, such as estimation unit 232, in stages, respectively, and an arranger 234 which produces the L frame sequence in the normal order by interleaving the L frames completed by the inverse estimation unit 232 to the output L frames of the inverse update unit 231.

The L frames output from the arranger 234 becomes the L frame sequence 701 at the level N−1. The L frame sequence 701, together with the incoming H frame sequence 702 of the level N−1, is restored to the L frame sequence by an inverse update unit and an inverse estimation unit of the next stage. This process is performed as much as the MCTF level at the encoding, and thus the original video frame sequence is restored.

The restoring of the H frames to the L frames at the level N is explained in detail according to an embodiment of the present invention. First, with respect to an arbitrary L frame, the inverse update unit 231 subtracts the error value of all the macro blocks in the H frames, of which the image difference is acquired based on the reference block being a block in the arbitrary L frame, from the corresponding block of the arbitrary L frame.

The inverse estimation unit 232 restores, with an arbitrary H frame, the macro blocks to its pixel values according to a well-known scheme based on the motion vector information provided from the motion vector decoder 235, excluding the macro block which is intra-coded using the prediction information of the corresponding block of the base layer.

To restore the original image with respect to the macro block in which the header information indicates the intra-coding using the prediction information of the corresponding block of the base layer, the motion vector decoder 235 first checks the prediction mode mode and the DoP information of the corresponding block of the base layer provided from the BL decoder 240, and restores the original pixel values of the current macro block intra-coded accordingly.

Referring back to FIGS. 4A through 4C in which the cells are split in the same size as the prediction mode of the corresponding block of the intra mode of the base layer and the DoP is used, the inverse estimation unit 232 splits the current macro block into cells in the same mode as the prediction mode (intra 4×4 or intra 8×8) of the corresponding block, and acquires the original pixel values of the cells by duplicating the DoP information of the corresponding block of the base layer, for example, by duplicating it four times if the screen size ratio is 4 and applying them to the four adjacent split cells. In case of the unsplittable prediction mode, that is, in case of the intra 16×16 as shown in FIG. 4C, the original pixel values of the current macro block are restored using the DoP of the corresponding block.

The method for restoring the original pixel values using the DoP of the corresponding block acquires a reference value applied to the pixels according to the corresponding DoP, from the adjacent macro blocks previously restored or the original pixel values, and then restores the original pixel values by adding the reference value and the current difference value of the pixel. In some cases, even when the macro blocks adjacent to the current macro block are the inter-frame mode, the restored pixel value, that is, the decoded pixel values without substituting the pixel values of the adjacent line with 128 may be used to acquire the reference value. Since three previous blocks adjacent to the current macro block, that is, the left block, the upper block, and the top left block are restored prior to the current block in the decoding, there is no problem in using the original pixel values.

Referring back to FIGS. 5A through 5C in which the cells are split in the mode which multiplies the size of the prediction mode of the corresponding block of the base layer by the screen size ratio, for example, by 4, the inverse estimation unit 232 splits into the cells of 8×8 if the prediction mode of the corresponding block is the intra 4×4, and acquires the original pixel values of the cells by applying the DoP information of the 4×4 area in the corresponding block one by one (FIG. 5A). In case of the unsplittable prediction mode, that is, the intra 8×8 and the intra 16×16 (FIGS. 5B and 5C), the original pixel values of the current macro block is restored using the DoP of the corresponding block. However, since a higher mode of the prediction mode applied to the blocks of the base layer is applied to the blocks of the enhanced layer, it may be impossible to apply the DoP applied to the blocks of the base layer to the current macro block as shown in FIG. 5B. In this case, the inverse estimation unit 232 restores the original pixel values by performing the inverse operation of the preset scheme, for example, the DC or the plane prediction.

In the embodiment which codes the difference between the error data with respect to the blocks of the enhanced layer using the prediction information of the intra mode block of the base layer, after the pixel values of the current macro block are added with the pixel values of the corresponding block of the base layer or the partial area of the corresponding block, the original pixel values are restored using the prediction information of the corresponding block as explained earlier. For doing so, the BL decoder 240 provides the base layer frames before the decoding to the MCTF decoder 230. When the enhanced layer and the base layer are different from each other in the screen size, the base layer frames are enlarged according to the difference ratio and then provided.

One frame is processed by a certain unit, for example, by slices in parallel, and the original image of all of the macro blocks in the frame is restored. Next, the complete video frame is reconstructed by combining them all.

As such, the data stream encoded in the MCTF scheme is restored to the complete video frame sequence using the prediction information of the intra mode block of the base layer. The decoding apparatus can be mounted in a mobile communication terminal or a device which reproduces the recording medium.

As set forth above, in the MCTF encoding, when the intra-mode block is reconstructed using the encoding information of the base layer, which is provided for the decoder having low capability, in addition to the frames of the enhanced layer, the hardware complexity of the encoding apparatus can be lowered.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An apparatus of decoding a video signal, comprising:
a de-muxer receiving a bitstream of an enhanced layer and a bitstream of a base layer;
a first decoder extracting a residual value of an image block from the bitstream of the enhanced layer;
a second decoder extracting intra mode prediction information of a corresponding block from the bitstream of the base layer, the corresponding block being temporally coincident with a frame including the image block; and
the first decoder obtaining a prediction value of the image block using an adjacent pixel of the image block and the intra mode prediction information, and reconstructing the image block of the enhanced layer based on the residual value of the image block and the prediction value of the image block.

2. The apparatus of claim 1, wherein the corresponding block is located at the same position as the image block, or covering an area of the same position as the image block.

3. The apparatus of claim 1, wherein the intra mode prediction information includes information relating to a prediction mode and a prediction direction.

4. The apparatus of claim 3, wherein the prediction mode is selected to one of intra 4×4, intra 8×8 and intra 16×16.

5. The apparatus of claim 1, wherein the first decoder extracts header information from the bitstream of the enhanced layer, and reconstructs the image block when the header information of the image block indicates that the image block is coded by using the intra mode prediction information of the corresponding block.

6. The apparatus of claim 1, wherein the second decoder extracts a residual value of the corresponding block from the bitstream of a base layer, and the first decoder reconstructs the image block based on the residual value of the corresponding block.

7. A method for decoding a video signal, comprising:
receiving a bitstream of an enhanced layer and a bitstream of a base layer;
extracting a residual value of an image block from the bitstream of the enhanced layer;
extracting intra mode prediction information of a corresponding block from the bitstream of the base layer, the corresponding block being temporally coincident with the image block;
obtaining a prediction of an image block using an adjacent pixel of the image block and the intra mode prediction information; and
reconstructing the image block of the enhanced layer based on the residual value of the image block and the prediction value of the image block.

8. The method of claim 7, wherein the corresponding block is located at the same position as the image block, or covering an area of the same position as the image block.

9. The method of claim 7, wherein the intra mode prediction information includes information relating to a prediction mode and a prediction direction.

10. The method of claim 9, wherein the prediction mode is selected to one of intra 4×4, intra 8×8 and intra 16×16.

11. The method of claim 7, further comprising:
extracting header information from the bitstream of the enhanced layer,
wherein the reconstructing is performed when the header information of the image block indicates that the image block is coded by using the intra mode prediction information of the corresponding block.

12. The method of claim 7, further comprising:
extracting a residual value of the corresponding block from the bitstream of the base layer,
wherein the reconstructing is performed based on the residual value of the corresponding block.

* * * * *